United States Patent
Divisek et al.

[11] Patent Number: 5,998,056
[45] Date of Patent: Dec. 7, 1999

[54] ANODE SUBSTRATE FOR A HIGH TEMPERATURE FUEL CELL

[75] Inventors: Jiri Divisek, Jülich, Germany; Lambertus G.J. de Haart, Heerlen, Netherlands; Ernst Riensche, Jülich; Ulrich Stimming, Aachen, both of Germany

[73] Assignee: Forschungszentrum Jülich GmbH, Jülich, Germany

[21] Appl. No.: 08/980,852

[22] Filed: Nov. 29, 1997

Related U.S. Application Data

[63] Continuation-in-part of application No. PCT/DE96/00918, May 28, 1996.

[30] Foreign Application Priority Data

May 31, 1995 [DE] Germany .................... 195 19 847

[51] Int. Cl.⁶ ..................................... H01M 4/86

[52] U.S. Cl. .................. 429/41; 429/40; 429/44

[58] Field of Search ................. 429/40, 41, 44, 429/38, 39

[56] References Cited

U.S. PATENT DOCUMENTS

| | | | |
|---|---|---|---|
| 4,770,955 | 9/1988 | Ruhl | 429/33 |
| 4,774,152 | 9/1988 | Matsumura et al. | 429/40 |
| 5,064,733 | 11/1991 | Krist et al. | 429/40 |

FOREIGN PATENT DOCUMENTS

| | | |
|---|---|---|
| 0 173 904 | 3/1986 | European Pat. Off. . |
| 840097271 | 11/1985 | Japan . |
| 900078667 | 12/1991 | Japan . |
| 910036005 | 9/1992 | Japan . |
| 910280247 | 5/1993 | Japan . |
| 6342663 | 12/1994 | Japan . |
| 940158661 | 2/1996 | Japan . |

*Primary Examiner*—Bruce F. Bell
*Attorney, Agent, or Firm*—Klaus J. Bach

[57] ABSTRACT

In an anode structure for a high temperature fuel cell which has a non-catalytic phase and a catalytic phase with respect to methane-vapor reforming reactions, a substrate with a bi-polar plate disposed thereon has areas of different catalytic activity levels, that is, an area in which the regular catalytic metallic phase has been replaced by a catalytic metallic phase with low catalytic activity whereby the methane vapor reforming reaction is delayed in the areas of reduced catalyst activity.

2 Claims, 1 Drawing Sheet

ANODE SUBSTRATE FOR A HIGH TEMPERATURE FUEL CELL

This is a continuation-in-part application of international application PCT/DE96/00918 filed May 28, 1996 designating the US and claiming priority of German Application 195 19 847.6 filed May 31, 1995.

BACKGROUND OF THE INVENTION

The invention resides in an anode substrate with a bi-polar plate disposed thereon for a high temperature fuel cell which anode substrate has a phase in which it does not act as catalyst with regard to methane-vapor reforming reactions and a phase in which it acts as a catalyst.

A high temperature fuel cell (SOFC) comprises a stack of fuel cells with an associated periphery. The basic components in a fuel cell are the electrolyte [material for example yt-trium-stabilized zirconium dioxide (YSZ) ; $ZrO_2$-8mol%$Y_2O_3$], the cathode[material for example strontium-doped lanthanium manganese oxide (LSM); $La_{1-x-y}Sr_xMnO_{3-2}$] and the anode consisting of ceramic (=non catalytically acting) as well as as a metallic (=catalytically acting) phase [for example nickel-YSZ Cermet; 40 vol% Ni/$ZrO_2$-8 mol% $Y_2O_3$]. For a series and/or parallel arrangement of several cells in a stack a fourth arrangement of several cells in a stack a fourth component is required; a bi-polar plate (material for example earth alkaline metal-doped lanthanum chromate; $La_x Me_x CrO_3$(Me=Sr, Ca) or a high temperature Cr-alloy; $Cr_5Fe_1(Y_2O_3)$] [A Hammou, Adv. Electrochem. Sci. and Engin. 2(1992) 87–139; N.Q. Minh, J. Am. Ceram. Soc. 76 (1993) 563–88; D. Stolten and W. Schafer, in ; Technische Keramische Werkstoffe, J. Kriegsmann (editor), Deutscher Wirtschaftdienst, John Freyland GmbH, Cologne, 1994, Chapter 8.5.2.0]

A stack of fuel cells is set up in accordance with two concepts. The first concept is based on tubes which have support functions and which must provide for the mechanical stability of the cell. The tubes consist either of an inert material or of one of the two electrode materials. The functional components are disposed on these tubes as layers arranged in a specific geometry and order. The second concept utilizes self-supporting electrolyte foils and bi-polar plates in a flat geometry. The two electrodes are disposed as layers on the electrolyte foil. The electrolyte foil as well as the bi-polar plate must insure the mechanical stability of the arrangement. [A Hammou, Adv. Electrochem. Sci. and Engin. 2(1992) 87–139; N.Qminh, J. Am. Ceram. Soc. 76 (1993) 563–88; D. Stolten and W. Schafer, in ; Technische Keramische Werkstoffe, J. Kriegsmann (editor), Deutscher Wirtschaftdienst, John Freyland GmbH, Cologne, 1994, Chapter 8.5.2.0]

Both stacking concepts mentioned above have their specific disadvantages. Because of the geometry, the tube concept provides for relatively long charge transport paths which results in relatively high ohmic losses. Because of a relatively large-pore porosity of the porous support tube a substantial minimum thickness is required for the electrolytic layer in order to make it gas-tight. The flat cell concept has the disadvantage that the self supporting electrolyte foils have to have a certain minimum thickness in order to insure mechanical stability. This also limits a self-supporting electrolyte foil to a certain size (effective surface area). As a result, in both concepts, the stacks can be operated without substantial losses only above 900° C. because of the relatively thick electrolyte layers (or foils). In order to eliminate these disadvantages, the substrate concept with a flat geometry has been developed. This includes a porous substrate consisting of one of the two electrode materials which fulfills a support function and which, as a result, needs to be relatively thick in order to permit cells of reasonably large sizes to be manufactured. On this substrate a very thin electrolyte layer is deposited by a thin film manufacturing process and, in a next step, the second electrode layer is deposited on this electrolyte layer by one of the usual manufacturing processes. These three-layer cell units are assembled in series to a stack with the usual bi-polar plates [T. Iwata and H. Shundo, $2^{nd}$ Symp. SOFC Japan, Tokyo, Dec. 15–16, 1993, Extended Abstract No. 101, p. 1–4].

The state of the art has the following disadvantage: If natural gas is fed into the anode space, the methane vapor reformation reaction occurs directly at the metal/YSZ-Cermet since the metallic phase (for example NI) acts in accordance with the state-of-the-art as a catalyst with respect to the methane-vapor reformation reaction. This reaction is strongly endothermic (Δ+227.5 kg J/mol at 1000° C.) arid accordingly removes heat from its environment. In addition, the reaction rate of this reaction is very high as compared to the following electrochemical reactions (at 900° C. factor 40). As a result, the reformation reaction is completed already within a distance of 10 mm from the point where the methane vapor enters the anode chamber. The heat required within such a short distance cannot be supplied by the much slower electrochemical reactions, so that the temperature drops. For this reason, the stack variations referred to above require a pre-reformer in the periphery where some o the methane-vapor reformation reactions occur in order to avoid large temperature gradients in the stack, that is, in order to achieve a more uniform temperature distribution.

It is the object of the present invention to provide an anode substrate, which has disposed thereon a bi-polar plate for a high temperature fuel cell with which a uniform temperature distribution can be achieved in a simple manner.

SUMMARY OF THE INVENTION

In an anode structure for a high temperature fuel cell which has a non-catalytic phase and a catalytic phase with respect to methane vapor reforming reactions, a substrate with a bi-polar plate disposed thereon has areas of different catalytic activity levels, that is, an area in which the catalytic metallic phase has been replaced by a catalytic metallic phase with low catalytic activity whereby the methane vapor reforming reaction is delayed in the areas of reduced catalyst activity.

A reduced catalyst activity is obtained in that the concentration of the catalytically effective metallic phase in the substrate is reduced with respect to the usual concentration (preferably by about 30–40% of the metal). The catalytically effective metallic phase can also be replaced by a catalytically inactive or only slightly active metallic phase. As metals then particularly transition metals of the first or second row such as Fe or Co may be selected since (for example, in comparison with Ni), they have a substantially lower activity for the methane-vapor reforming reaction. The reason for the replacement of the catalytically active metallic phase is the need for maintaining the electric conductivity of the substrate. Consequently, the concentration of the non- or slightly catalytically effective metallic phase should be selected accordingly.

Areas of reduced catalyst concentration for a delayed methane-vapor reforming reaction are then present if they are disposed within the fuel cell immediately adjacent to the gas passages. The contact of the gas passing through the gas passages with the catalyst and, consequently, the reaction process is delayed by this arrangement. Preferably, the concentration of the reformation catalyst is reduced in the critical entrance area of the anode chamber. The catalyst amount is so reduced that the relative speeds of the electrochemical arid the reformation reactions are essentially the same.

In an optimal embodiment of the invention, the various processes; electric charge transport through the metallic phase, gas transport through the pores, methane vapor reformation at the reformation catalyst surface and electrochemical oxidation of the fuel gas at the interface electrolyte/anode are adapted to one another by graduation of the composition, the porosity and the pore distribution of the anode substrate in a spatial and time based manner so as to avoid the disadvantageous temperature gradients.

The invention can be realized with a sufficiently thick anode layer. Preferably, the substrate has a thickness of 0.5 mm to 5 mm.

Advantageous effects of the substrate cell with flat geometry and graduated catalyst concentration and micro structure as provided by the present invention are:

- A predetermined graduation of the metal concentration facilitates a complete internal reformation with a uniform temperature distribution.
- With the realization of the internal reformation, there is no need for a peripheral pre-reformer.
- With internal reformation without pre-reformer fuel gas can be recirculated by way of an anode circuit and the stack can be operated with a relatively low use of fuel gas.
- Internal reformation greatly reduces the need for cooling air.
- The substantially reduced amount of cooling air required permits recirculation of the air by way of a cathode circuit.

DESCRIPTION OF A PREFERRED FMBODIMENT

Figure 1A:
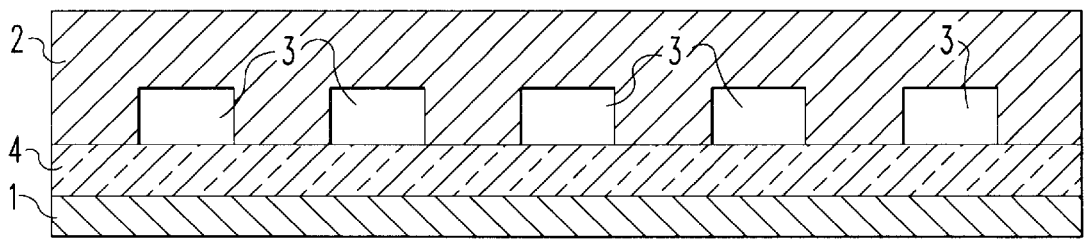
FIGS. 1a and 1b show a substrate with a layer area having a reduced catalyst concentration.
Figure 1B:
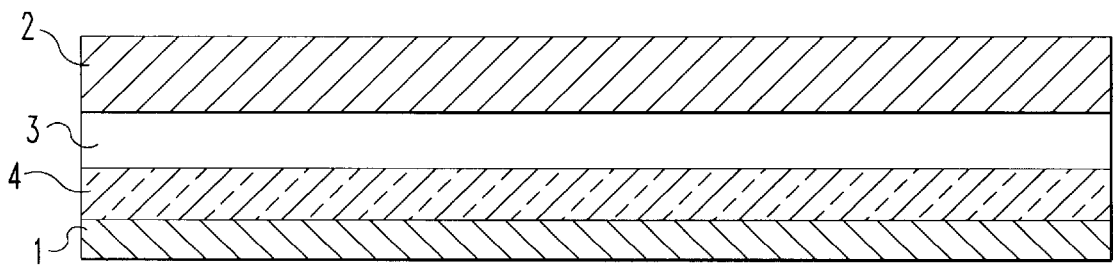

FIGS. 1a and 1b are cross-sectional views of a substrate cell in the area of the anode substrate/bi-polar plate 2. The upper FIG. 1a indicates the entrance of the combustion gas (methane) into the anode chamber, that is, into the gas channels 3, which are formed in the bi-polar plate 2. The lower FIG. 1b is a side view of FIG. 1a turned by 90° from the FIG. 1a representation.

The anode substrate comprises two different layers 1 and 4. The lower layer 1 which has a thickness of 1 mm and which is in contact with the electrolyte has the usual composition of the NI/YSZ-cermet. The upper layer 4 with a thickness of 2 mm consists also of a metal/YSZ-cermet. However, other metals such as Fe and Co have been used. They have a clearly lower activity for methane-vapor reformation. The concentration of the Fe or, respectively, Co is so selected that the required electrical conductivity of the layer 4 is ensured.

Because of the lower activity of the upper part of the substrate layer the methane vapor reforming reaction is so delayed that it is only completed at the exit of the gas from the anode chamber.

Figure 2A:
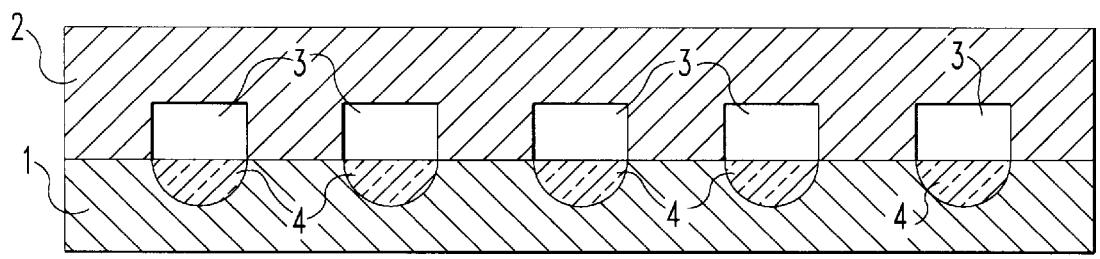
FIGS. 2a and 2b show a substrate with areas of reduced catalyst concentrations with a special geometry.
Figure 2B:
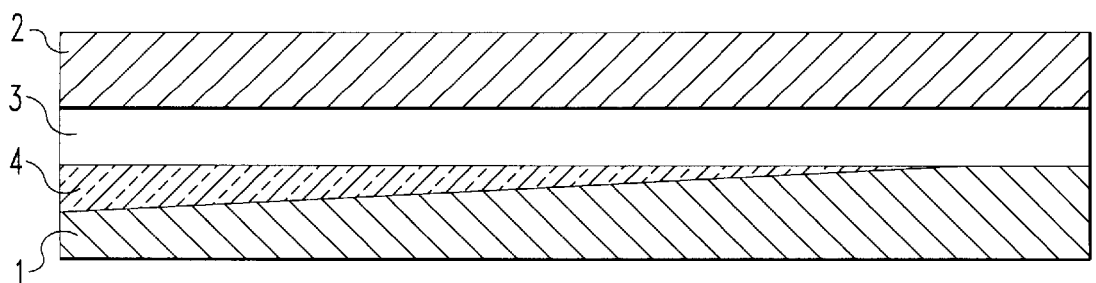

FIGS. 2a and 2b show in cross-section two side views of a substrate cell in area of the anode substrate/bi-polar plate 2. FIG. 2a indicates the entrance of the fuel gases (methane) into the anode chamber, that is, into the gas passages 3 which are provided in the bi-polar plate 2. FIG. 2b is a side view of the substrate turned by 90° and taken in a cross-section extending through the gas passage 3.

The anode substrate composition is as common except for the areas 4. The areas 4 are in direct contact with the gas passages 3 and are limited to the gas passages (see FIG. 2a). In these areas 4, the catalyst concentration (for example, Ni part) is reduced to 0 to 30 vol%). The concentration has a depth of between 0.001 and 1 mm. The depth of the area of reduced catalyst concentration of the gas passage decreases over its length in a continuous or discontinuous fashion (FIG. 2b).

The electrical conductivity in the areas 4 does not need to be compensated for—in contrast to the embodiment of FIGS. 1a and 1b, since current flow to the bi-polar plate 2 is insured because of the areas not subjected to reduced catalyst concentration (see FIG. 2a). However, a substrate as shown in FIGS. 1a, 1b is easier to manufacture than a substrate as shown in FIGS. 2a, 2b.

What is claimed is:

1. A high temperature fuel cell structure comprising: an anode substrate having a thickness of 0.5 to 5 mm so as to be self-supporting, a catalytically active metallic electrolyte layer formed on said anode substrate, a bi-polar plate disposed on said electrode layer of said anode structure and having fuel passages extending therethrough along said electrolyte layer and including entrance and exit areas, said catalytically active metallic electrolyte layer having in said entrance area a catalytic activity which is lower than the catalytic activity of electrolyte layer near said exit area for delaying methane vapor reformation action in the fuel entering said fuel passages such that methane vapor reformation occurs uniformly over the full length of the fuel passages.

2. A high temperature fuel cell structure according to claim 1, wherein said catalytically active metallic electrolyte includes in said entrance area one of the transition metals of the first and second rows.

* * * * *